United States Patent [19]

Kawabe

[11] Patent Number: 5,176,040
[45] Date of Patent: Jan. 5, 1993

[54] TRANSMISSION FOR 4-WHEEL DRIVING

[75] Inventor: Masato Kawabe, Hamamatsu, Japan

[73] Assignee: Suzuki Motor Corporation, Shizuoka, Japan

[21] Appl. No.: 641,289

[22] Filed: Jan. 15, 1991

[30] Foreign Application Priority Data

Jan. 31, 1990 [JP] Japan .................................. 2-21729

[51] Int. Cl.$^5$ ............................................ F16H 57/04
[52] U.S. Cl. ...................................... 74/467; 475/159; 277/152
[58] Field of Search .................. 277/152, 153; 74/46.7, 74/606 R; 475/200, 220, 159; 180/248

[56] References Cited

U.S. PATENT DOCUMENTS

| 2,437,901 | 3/1948 | Winkeljohn | 277/153 |
|---|---|---|---|
| 2,736,583 | 2/1956 | Marvin | 277/153 |
| 4,501,167 | 2/1985 | Saito | 74/606 R X |
| 4,872,770 | 10/1989 | Dickinson | 277/152 |
| 4,915,191 | 4/1990 | Kotajima | 180/248 |

FOREIGN PATENT DOCUMENTS

| 54-106755 | 8/1979 | Japan | 475/159 |
|---|---|---|---|
| 59-26664 | 2/1984 | Japan | 475/159 |
| 63-101571 | 5/1988 | Japan | 475/159 |
| 63-39450 | 8/1988 | Japan . | |
| 1-16687 | 3/1989 | Japan . | |

OTHER PUBLICATIONS

CR Seals Handbook, Catalog 457010, 1986 pp. 10 & 12.

Primary Examiner—Leslie A. Braun
Assistant Examiner—Ryan W. Massey
Attorney, Agent, or Firm—Flynn, Thiel, Boutell & Tanis

[57] ABSTRACT

A transmission apparatus for four-wheel drive includes a transfer mechanism for adjusting for the difference between rotating forces applied to front and rear wheels of a vehicle. A differential gear is coupled with a transmission, and the transfer mechanism is coupled with the differential gear. An annular oil sealing portion is provided on a shaft of the transfer mechanism to partition and separate the transfer mechanism from the differential gear.

12 Claims, 4 Drawing Sheets

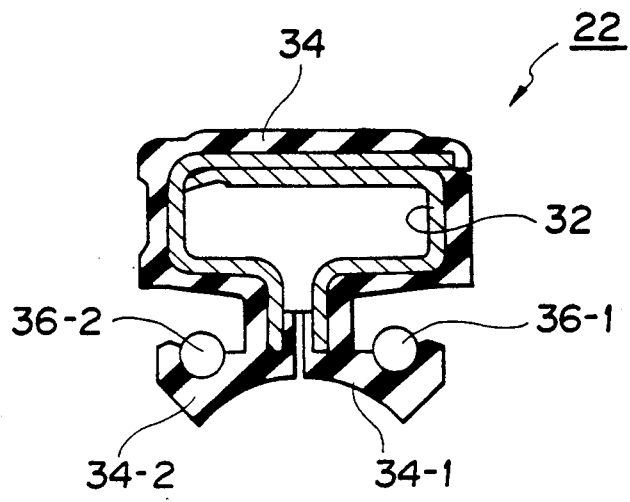
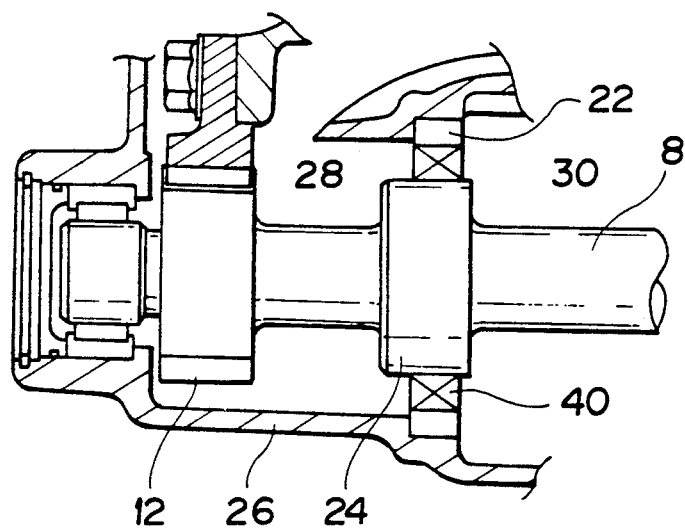

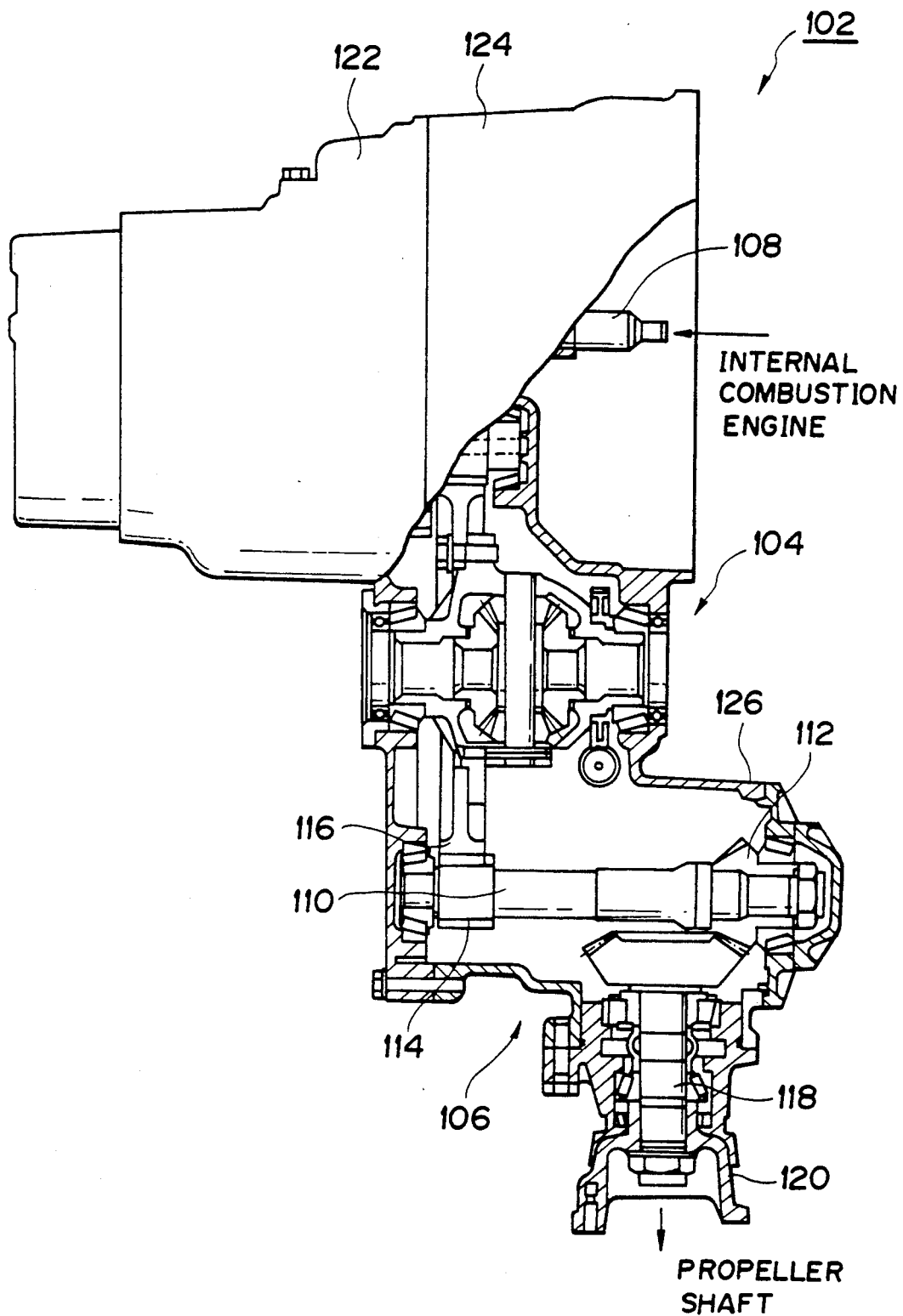

TRANSMISSION FOR 4-WHEEL DRIVING

FIELD OF THE INVENTION

The present invention relates to a transmission for 4-wheel drive and, more particularly, to a transmission for 4-wheel drive having a final deceleration differential gear which is drivingly engaged between the transmission and a transfer mechanism for adjusting for the difference between rotating forces to the front and rear vehicle wheels.

BACKGROUND OF THE INVENTION

A transfer mechanism is connected to a transmission of a vehicle and the difference between the rotating forces applied to the front and rear wheels is adjusted by the transfer mechanism.

For instance, a rear differential gear is connected to a rotational shaft of the transfer mechanism through a propeller shaft. The rotating force is transferred to the rear wheels by the rotational shaft.

The transfer mechanism has a transfer shaft having a gear on one end. Lubricating oil which is lifted up by the gear is supplied to a bearing portion of the rotational shaft. On the other hand, a final deceleration gear of the differential gear mechanism is in engagement with the other end of the transfer shaft, thereby transferring the driving force from the transmission to the transfer shaft.

A known transmission for 4-wheel drive is disclosed in JP-B-63-39450. According to a power unit for a vehicle disclosed in the above document, a subtransmission mechanism comprises: a subshaft whose both end portions are rotatably supported between a side wall of a clutch casing and a transmission casing and which is arranged in parallel with input and out shafts; an intermediate shaft whose both end portions are fitted and supported; a subinput gear which is rotatably fitted to the intermediate shaft; a suboutput gear which is fixed to the subshaft; a deceleration input gear which is integratedly formed on one side of the subinput gear; a deceleration output gear; and a synchronizing mechanism, wherein a subtransmission mechanism which can obtain a large deceleration ratio without changing the existing transmission and a vehicle body structure is additionally provided and assembling the subtransmission mechanism is easy.

Another known apparatus is disclosed in JP-B-1-16687. According to the 4-wheel driving apparatus disclosed in the above document, in a driving apparatus which realizes a common use of the parts for 4-wheel driving and 2-wheel driving by fixing a transfer casing to a clutch housing by bolts in at least a part of the transfer casing so as to face the edge surface which extends in the front and rear directions of the vehicle body in the side portion of the engine side of an enclosing portion of a front differential gear of the clutch housing, a large enough degree of freedom for a motive power transfer system is assured with respect to an arrangement of a mechanism to extract an output for driving the rear wheels while avoiding an interference with the engine.

In a conventional transmission for 4-wheel drive, as shown in FIG. 5, a transmission 102 has: a front side differential gear 104; a transfer mechanism 106; a transmission side input shaft 108 serving as an input shaft of a gear transfer system for inputting a driving force from an internal combustion engine (not shown); and a counter shaft (not shown) serving as an intermediate shaft for transferring the rotating force of the transmission side input shaft 108 to the differential gear 104.

The transmission 102 is coupled with the differential gear 104 for rotating the front wheels (not shown) via a drive shaft.

The transfer mechanism 106 which is coupled with the differential gear 104 has therein a transfer shaft 110. A bevel gear 112 is provided on one end of the transfer shaft 110 and a driven gear 114 is provided on the other end. Thus, the transfer mechanism 106 distributes the driving force of the internal combustion engine, which driving force is transferred from the transmission 102 through the driven gear 114 as engaged with a final deceleration gear 116 on the front side differential gear 104, and ultimately to a rotational shaft 118 through the bevel gear 112. The driving force which is output from the rotational shaft 118 is transferred to the rear wheels (not shown) via a propeller shaft (not shown) connected through a coupler 120, a rear side differential gear, and the like.

As will be obvious from FIG. 5, when a transmission casing 122, a clutch housing 124, and a transfer casing 126 are coupled together, an internal space portion of the transmission 102 is also coupled, thereby forming one internal space. Lubricating oil is supplied into this one internal space, thereby accomplishing lubrication in each portion.

However, when the transfer mechanism is lubricated by using an ATF (automatic transmission fluid or oil) of low viscosity, there are inconveniences such that the required quantity of the ATF is large, the quantity of the ATF changes remarkably, the temperature of the ATF easily rises, and an absence of lubricating oil occurs at the engaging portion of each gear such as a bevel gear or the like and in the bearing portion, so that a defective lubricating state is caused.

On the other hand, in a manual operating type transmission, when a lubricating oil of high viscosity is used, there are inconveniences in that the lubricating oil is attracted by the differential gear which is rotated in association with the rotation of the transmission, the lubrication of the transfer mechanism is not sufficiently executed, and the synchronizing mechanism of the transmission is lubricated by the high viscosity lubricating oil, so that the shift feeling is increasingly influenced such that it deteriorates.

To eliminate the above inconveniences, it is therefore an object of the present invention to provide a transmission for 4-wheel drive in which a final deceleration differential gear is coupled with the 4-wheel drive transmission, a transfer mechanism is coupled with the differential gear, and an oil sealing portion is formed on a shaft of the transfer mechanism to partition and separate the transfer mechanism from the differential gear. The inside of the transmission can thus be separately partitioned into two separate portions, so that lubricating oils of different viscosities are respectively supplied to those separate portions, and lubrication can be efficiently performed.

According to the invention, in a transmission for 4-wheel drive having a transfer mechanism for adjusting the difference between rotating forces applied to the front and rear vehicle wheels, a final deceleration differential gear is coupled with the transmission; a transfer mechanism is coupled with the differential gear; and an oil sealing portion is formed on a shaft of the transfer mechanism to partition and separate the transfer mechanism from the differential gear.

BRIEF DESCRIPTION OF THE DRAWINGS

An embodiment of the present invention will be described in detail hereinbelow on the basis of the drawings, in which:

FIG. 3 is an enlarged radial cross-sectional view of the oil sealing portion of FIG. 1;

FIG. 4 is a cross-sectional view similar to FIG. 1, showing a main section of an oil sealing portion according to another embodiment of the invention; and FIG. 5 is a schematic diagram of a conventional transmission.

DETAILED DESCRIPTION

Figure 1:
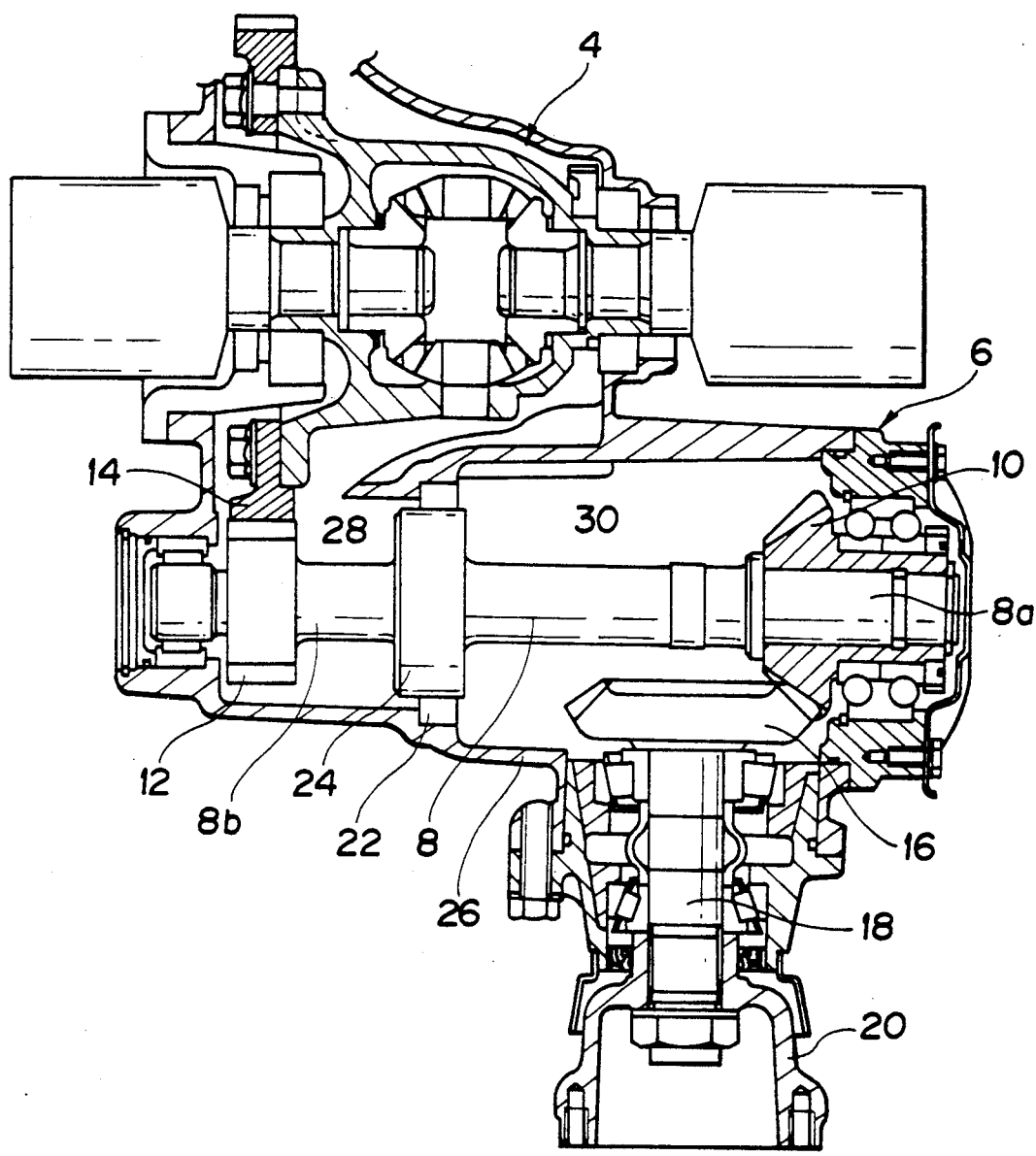
FIG. 1 is a cross-sectional view of part of a drive train, showing a main section of an oil sealing portion according to one embodiment of the present invention.
Figure 2:
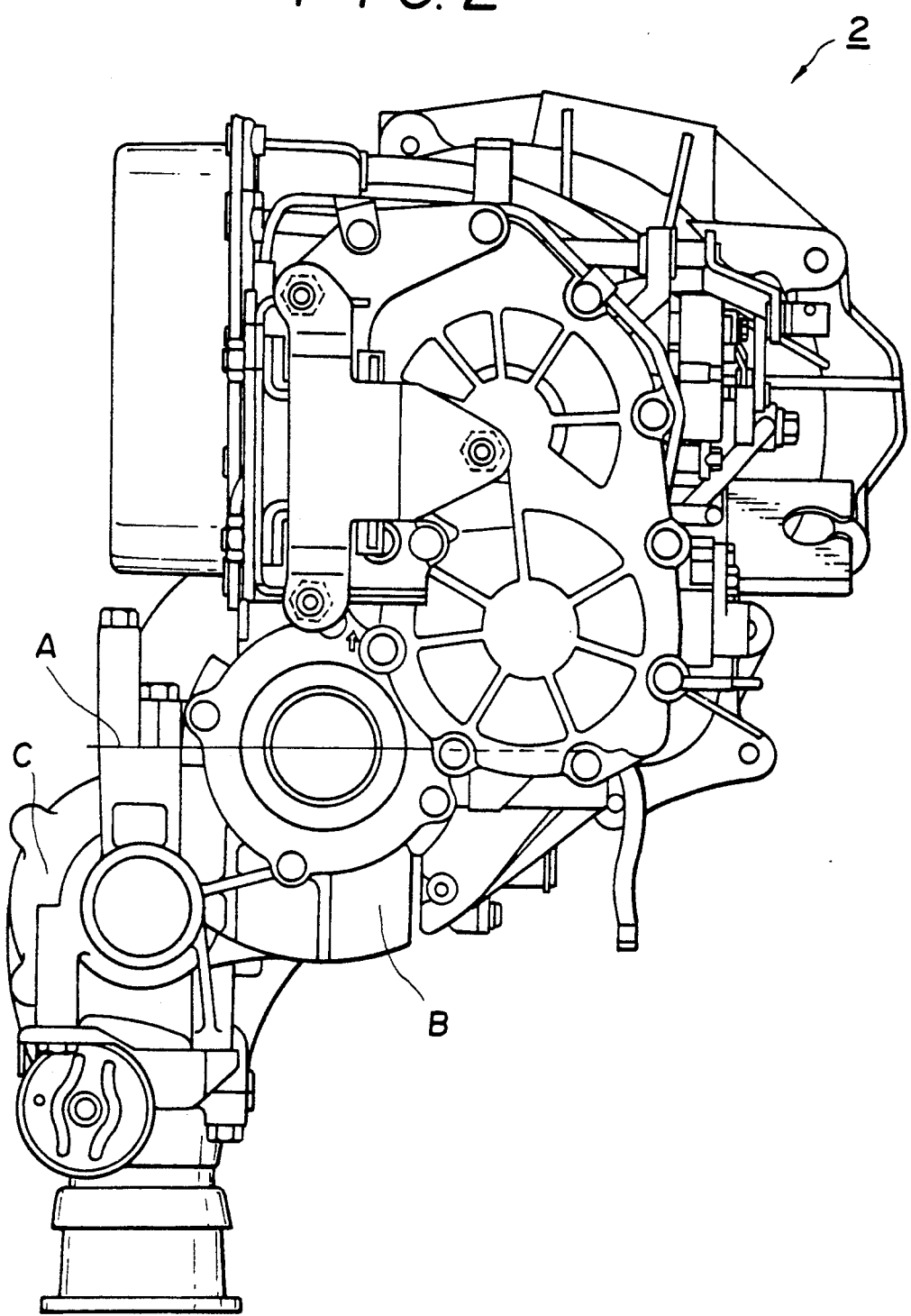
FIG. 2 is a schematic side elevational view of a transmission in which the present invention may be used.

FIGS. 1 to 3 show an embodiment of the invention. In FIGS. 1 and 2, reference numeral 2 denotes a transmission for 4-wheel drive, 4 indicates a front side differential gear for final deceleration, and 6 a transfer mechanism.

The transmission 2 is coupled with the differential gear 4 for rotating front wheels (not shown) via a drive shaft.

The transfer mechanism 6 coupled with the differential gear 4 has therein a transfer shaft 8. A ring (i.e. bevel) gear 10 is attached to one end 8a of the transfer shaft 8 and a driven gear 12 is attached to the other end 8b. Therefore, the transfer mechanism 6, which distributes the driving force of the internal combustion engine, outputs the driving force which is transferred from the transmission 2 by the driven gear 12 which engages with a final deceleration gear 14 of the front side of differential gear 4 to cause rotation of a rotational shaft 18 via a transfer bevel gear 16, the ring gear 10 and the transfer shaft 8. The driving force which is output from the rotational shaft 18 is transferred to rear wheels (not shown) via a propeller shaft (not shown) connected through a coupler 20, a rear side differential gear, and the like.

An annular oil sealing portion 22 which partitions and separates the transfer mechanism 6 and the front side differential gear 4 is provided on the transfer shaft 8. Explaining in detail, a large diameter hub portion 24 is formed on a portion of the transfer shaft 8 located generally centrally between the ends 8a and 8b, and the annular oil sealing portion 22 is arranged radially between a housing 26, which surrounds the front side differential gear 4 and transfer mechanism 6, and the large diameter portion 24. The inside of the housing 26 is partitioned and separated by the oil sealing portion 22 into a first space portion 28 on the side of differential gear 4 and a second space portion 30 on the side of the transfer mechanism 6.

As shown in FIG. 3, the oil sealing portion 22 is formed in a double lip shape by an interior shape-holding metal ring portion 32, a holding portion to hold the metal portion 32, and two annular springs 36-1 and 36-2. The shape holding metal portion 32 has a hollow, generally T-shaped radial profile. The oil seal 22 has a seal member 34 of a rubberlike or elastomeric material wrapped closely around and closely conforming to this T shape. The annular springs 36-1 and 36-2 are received in radially outwardly opening grooves formed in lip parts 34-1 and 34-2 of the oil seal member 34 which extend axially oppositely from the base of the T. The annular springs 36-1 and 36-2 function to securely hold the lip parts 34-1 and 34-2 in snugly surrounding relationship on the outer peripheral surface of the large diameter portion 24. The base of the T rests on the large diameter portion 24, whereby the lip parts 34-1 and 34-2 create a snug sliding seal with the hub portion 24.

Automatic transmission fluid (ATF) of low viscosity is supplied as a lubricating oil into the first space portion 28, and a gear oil serving as a lubricating oil of high viscosity is supplied into the second space portion 30 on the side of the transfer mechanism 6.

When the final deceleration gear 14 of the front side differential gear 4 is rotated by the driving of the internal combustion engine (not shown), the low viscosity ATF in the first space portion 28 is lifted up, thereby lubricating the gear engaging portion of the transmission 2 and the other portions.

On the other hand, when the transfer shaft 8 of the transfer mechanism 6 is rotated by the driven gear 12 as engaged with the final deceleration gear 14, the high viscosity gear oil in the second space portion 30 is lifted up by the ring gear 10 and supplied to the bearing portions of the rotational shafts 8 and 18.

Thus, the low viscosity ATF can be supplied into the first space portion 28, and the high viscosity gear oil can be supplied into the second space portion 30 on the transfer mechanism 6 side. A change in oil level can be reduced. The engaging portions of the gears such as transfer bevel gear 16 and the like and the bearing portions can be efficiently lubricated. Moreover, as compared with the conventional transmission using only low viscosity ATF, the required quantity of ATF is reduced and fouling of the ATF can also be decreased.

On the other hand, because the oil sealing portion 22 partitions and separates the inside of housing 26 into the first and second space portions 28 and 30, each lubricating path can be reduced and the lubricating efficiency can be improved.

Further, lubricating oils of different viscosities other than ATF and gear oil can also be supplied into the first and second space portions 28 and 30, so that the optimum lubricating oils suitable for the gears and bearings can be supplied, which is practically advantageous.

Furthermore, by arranging the annular oil sealing portion 22 between the housing 26 and the large diameter portion 24 on the central part of the transfer shaft 8, the oil sealing portion 22 contributes to vibration-proofing and strengthening of the transfer shaft 8.

On the other hand, since the front side differential gear 4 and the transfer mechanism 6 can be integrated, the weight can be reduced and the size can be miniaturized as compared with the apparatus in which they are separately formed. The layout of the automatic transmission and the layout of the manual transmission are almost the same. The parts of the propeller shaft, rear side differential gear, and the like can be made common to both automatic and manual transmissions, which is economically advantageous.

Moreover, by merely exchanging and attaching a bottom casing B and a transfer casing C below a line segment A in FIG. 2, it is also possible to change from a 4-wheel drive to a 2-wheel drive.

The invention is not limited to the foregoing embodiment but many variations and modifications are possible.

For instance, in the embodiment of the invention, the annular oil sealing portion 22 has been interposed between the housing 26 and the large diameter hub portion 24 on the transfer shaft 8. However, as shown in FIG. 4, it is also possible to provide a bearing 40 on the transfer shaft 8, with the annular oil sealing portion 22 interposed between the bearing 40 and the housing 26.

On the other hand, the embodiment of the invention has been described with respect to an automatic transmission which has low viscosity ATF in the first space portion thereof. However, the invention is also applicable to manual transmissions.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A power transfer apparatus for transmitting power from a change-speed transmission to the driving wheels of a four-wheel drive vehicle, comprising:
    a first differential mechanism for driving the front wheels of the vehicle, said first differential mechanism having a final reduction gear which is adapted to be driven by the change-speed transmission;
    a transfer mechanism comprising a rotatable transfer shaft, first and second bearings adjacent to the opposite axial ends of said transfer shaft, respectively, for rotatably supporting said transfer shaft, a first, driven gear mounted on said transfer shaft axially inside of and close to said first bearing and adapted to drivingly connect said transfer shaft to said final reduction gear, and a second, drive bevel gear mounted on said transfer shaft axially inside of and close to said second bearing;
    a rotatable shaft adapted to drive the rear wheels of the vehicle, a transfer, bevel gear secured to said rotatable shaft and meshed with said second, drive bevel gear;
    a casing enclosing said first differential mechanism, said transfer mechanism, said rotatable shaft and said transfer bevel gear, said casing including a partition wall separating said first differential mechanism from said transfer mechanism and providing a first opening therebetween for permitting said final reduction gear to mesh with said first, driven gear, said casing and said partition wall defining a second, circular opening of large diameter encircling said transfer shaft, said second, circular opening being located axially between said first, driven gear and said second, drive bevel gear and axially between said transfer bevel gear and said first opening,
    said transfer shaft having a circular, enlarged hub disposed within said second, circular opening and substantially completely filling same,
    an annular oil seal mounted on said partition wall and said casing inside said circular opening and encircling said hub, said annular oil seal sealing said circular opening against the flow of lubricant through said circular opening.

2. An apparatus as claimed in claim 1 in which said annular oil seal slidably sealingly engages the peripheral wall of said hub.

3. An apparatus according to claim 2, wherein said hub projects radially outwardly from an outer peripheral surface of said transfer shaft and extends through a radial distance which exceeds a radial thickness of said annular oil seal so that said hub contacts said annular oil seal at a location which is radially closer to said inner peripheral surface of said housing than to said outer peripheral surface of said transfer shaft.

4. An apparatus according to claim 1, wherein said annular oil seal is disposed in surrounding relationship relative to said hub, and further including a bearing for rotatably supporting said hub, said bearing being interposed radially between said annular oil seal and said hub.

5. An apparatus according to claim 1, wherein said hub is disposed generally centrally between said first, driven gear and said second, bevel drive gear but closer to said first, driven gear than to said second, bevel drive gear, said transfer shaft being free of bearing means between said first, driven gear and said second, bevel drive gear.

6. An apparatus as claimed in claim 1 in which said hub has substantially the same diameter as said first, driven gear.

7. An apparatus according to claim 1, wherein said annular oil seal includes a ring portion having a hollow, generally T-shaped radial profile, and an elastomeric seal member wrapped closely around the exterior of said ring portion.

8. An apparatus according to claim 7, wherein said annular oil seal is disposed in surrounding relationship relative to said hub, and further including a bearing for rotatably supporting said hub, said bearing being interposed radially between said annular oil seal and said hub.

9. An apparatus according to claim 8, wherein said hub is disposed generally centrally between said first and second gears but closer to said first, driven gear than to said second, drive gear.

10. An apparatus according to claim 7, wherein said seal member includes annular lip parts which project oppositely from a radially inner end of said T-shaped ring portion and extend generally parallel to said transfer shaft, and annular springs radially surrounding said lip parts for holding said lip parts in snug, sealing relationship with an outer peripheral surface of said hub.

11. An apparatus according to claim 10, wherein said hub extends through a radial distance which exceeds a radial thickness of said annular oil seal so that said hub contacts said annular oil seal at a location which is radially closer to said inner peripheral surface of said casing than to said transfer shaft.

12. An apparatus according to claim 11, wherein said hub is disposed generally centrally between said first and second gears but closer to said first, driven gear than to said second, drive gear.

* * * * *